(12) United States Patent
Ito

(10) Patent No.: US 9,536,182 B2
(45) Date of Patent: Jan. 3, 2017

(54) PRINTING APPARATUS, PRINTING APPARATUS CONTROL METHOD, AND STORAGE MEDIUM TO REGISTER ATTRIBUTE INFORMATION ABOUT SHEETS FOR PRINT JOBS

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/685,388

(22) Filed: Apr. 13, 2015

(65) Prior Publication Data
US 2015/0294200 A1 Oct. 15, 2015

(30) Foreign Application Priority Data

Apr. 15, 2014 (JP) .................. 2014-083595

(51) Int. Cl.
G06K 15/02 (2006.01)
H04N 1/00 (2006.01)
G06K 15/00 (2006.01)

(52) U.S. Cl.
CPC ....... *G06K 15/1809* (2013.01); *G06K 15/1823* (2013.01); *G06K 15/4065* (2013.01); *H04N 1/00* (2013.01); *G06K 15/002* (2013.01)

(58) Field of Classification Search
None
See application file for complete search history.

(56) References Cited

U.S. PATENT DOCUMENTS

2007/0146789 A1* 6/2007 Mima ............... B41J 11/485 358/1.16
2008/0180742 A1* 7/2008 Koike ............. H04N 1/00915 358/1.15
2011/0052290 A1* 3/2011 Kurakata ........... G03G 15/6585 399/388

FOREIGN PATENT DOCUMENTS

JP 2009-015356 A 1/2009

* cited by examiner

*Primary Examiner* — Andrew H Lam
(74) *Attorney, Agent, or Firm* — Canon USA, Inc. IP Division

(57) ABSTRACT

A printing apparatus includes a storing unit, an obtaining unit, a detecting unit, a display unit, and a setting unit. The storing unit stores a print job. The obtaining unit obtains sheet attribute information designated by the print job stored in the storing unit. The detecting unit detects an openable sheet holding unit being in a shut state. The display unit displays the sheet attribute information obtained by the obtaining unit in a case where the sheet holding unit is detected in the shut state by the detecting unit. The setting unit sets the sheet attribute information displayed by the display unit for the shut state sheet holding unit in the case where the sheet holding unit is detected in the shut state by the detecting unit.

20 Claims, 12 Drawing Sheets

FIG.3

| SHEET HOLDING UNIT | SIZE | GRAMMAGE | TYPE | NUMBER OF SHEETS |
|---|---|---|---|---|
| CASSETTE 1 | A4 | 93 g/m² | PLAIN PAPER | 200 |
| CASSETTE 2 | A4 | 150 g/m² | THICK PAPER | 0 |
| CASSETTE 3 | — | — | — | 0 |
| CASSETTE 4 | — | — | — | 0 |
| MANUAL BYPASS TRAY | — | — | — | 0 |

FIG.5

| No. | JOB ID 401 | JOB NAME 402 | STATUS | PRINT ATTRIBUTE 403 | MISMATCH FLAG 422 500 |
|---|---|---|---|---|---|
| 1 | 001 | JobA | PRINT PROCESSING IN PROGRESS | A4 PLAIN PAPER 100 SHEETS | 0: MATCH |
| 2 | 002 | JobB | PRINT STANDBY | A4 THICK PAPER 20 SHEETS | 1: MISMATCH |
| 3 | 003 | JobC | PRINT STANDBY | A3 THICK PAPER 50 SHEETS | 1: MISMATCH |
| 4 | 004 | JobD | PRINT STANDBY | A3 COATED PAPER 10 SHEETS | 1: MISMATCH |
| 5 | 005 | JobE | PRINT STANDBY | A4 PLAIN PAPER 100 SHEETS | 0: MATCH |
| ... | ... | ... | ... | ... | ... |

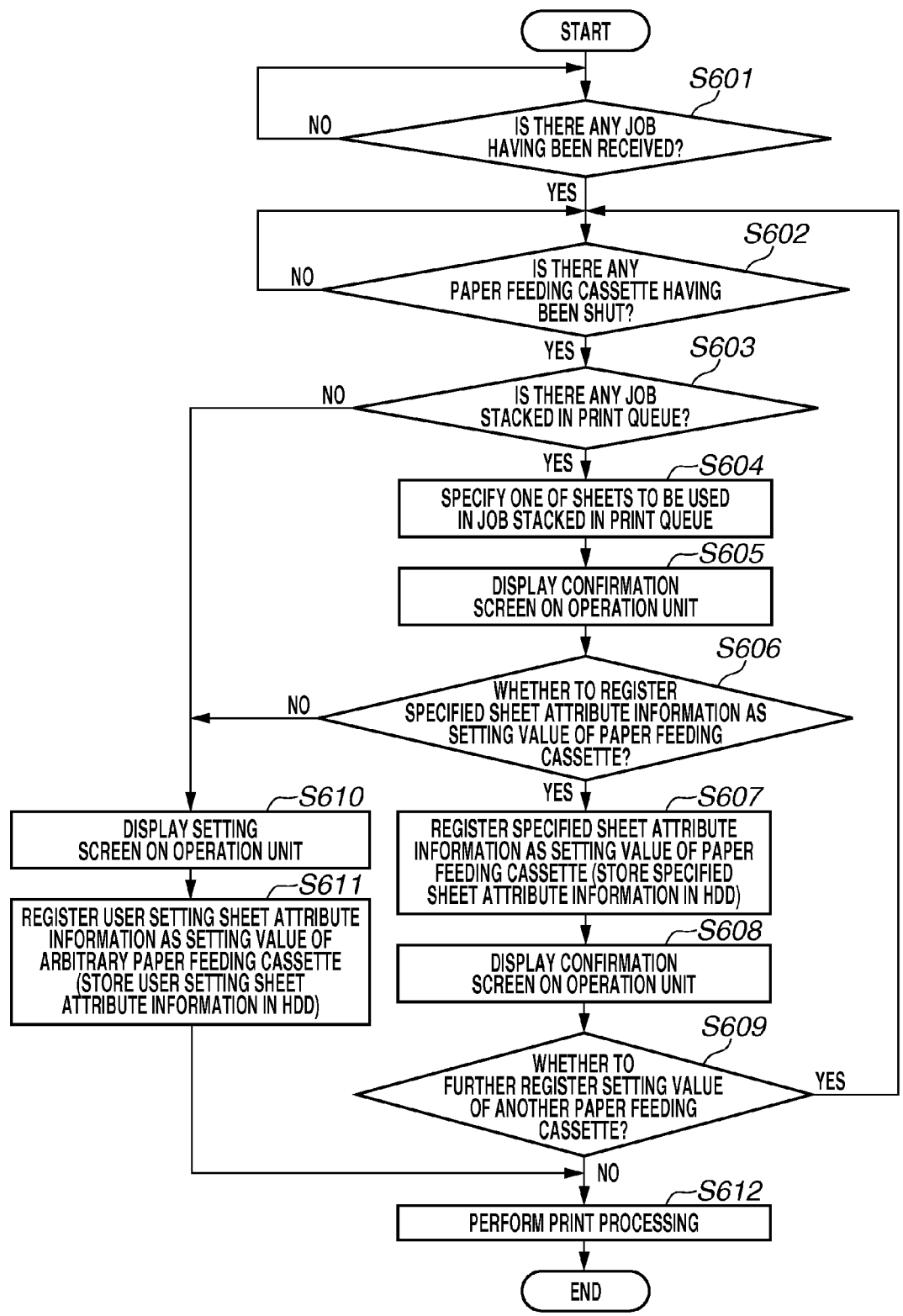

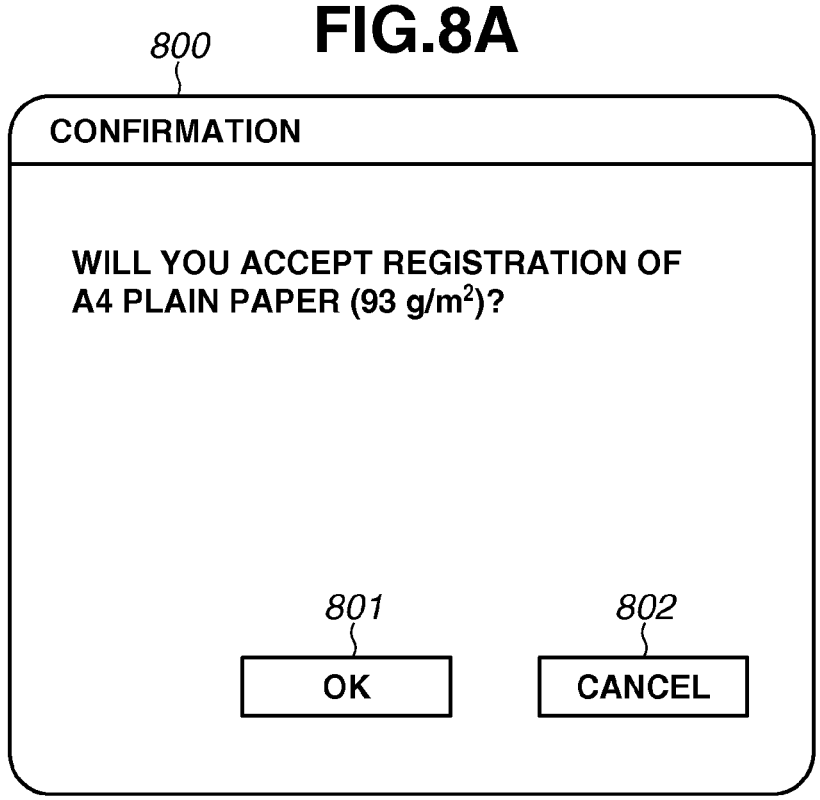
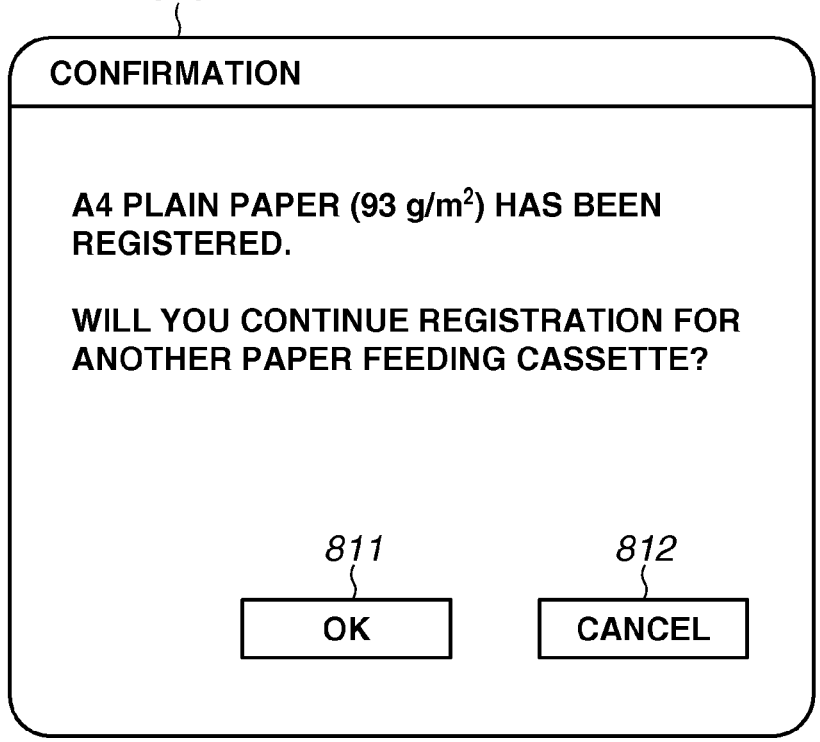

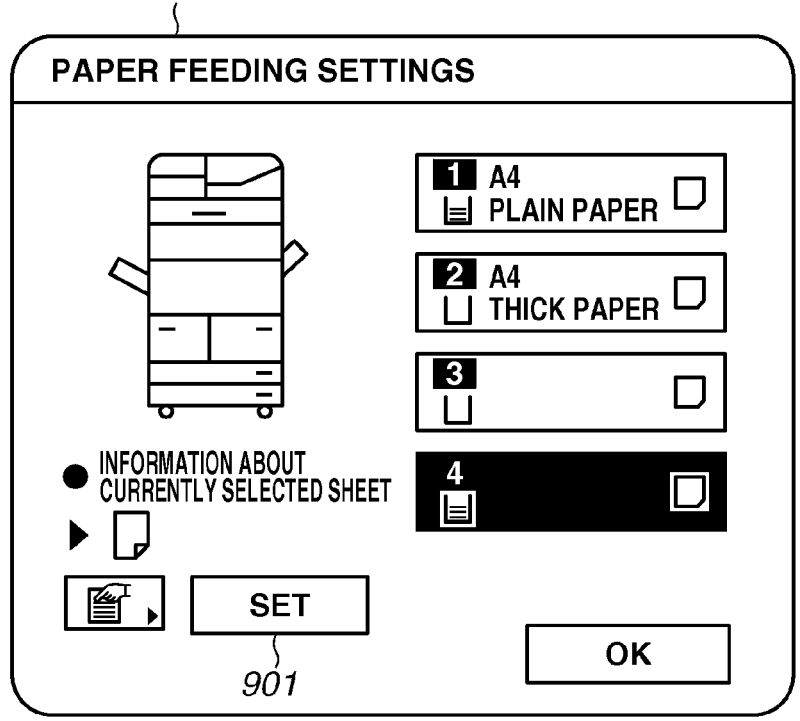
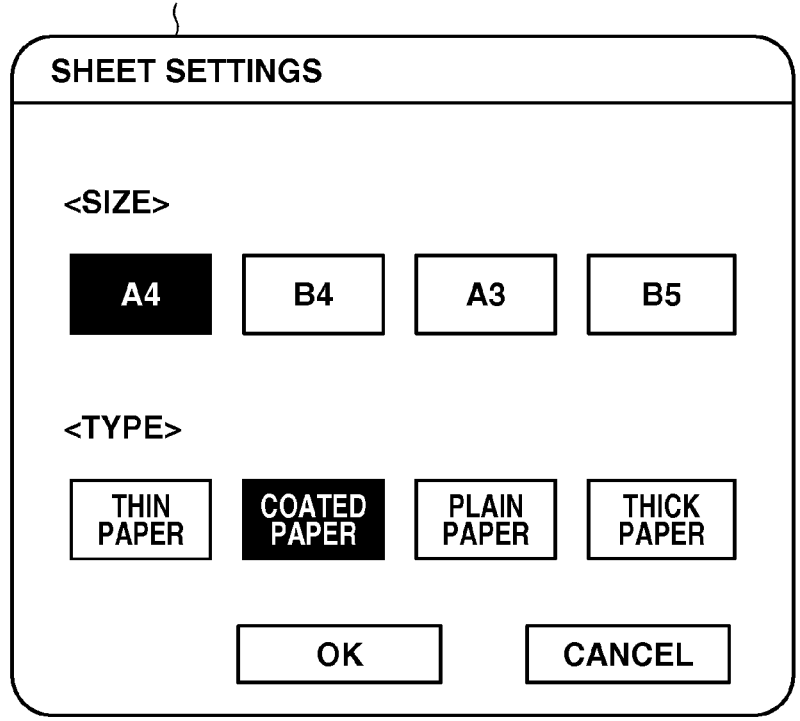

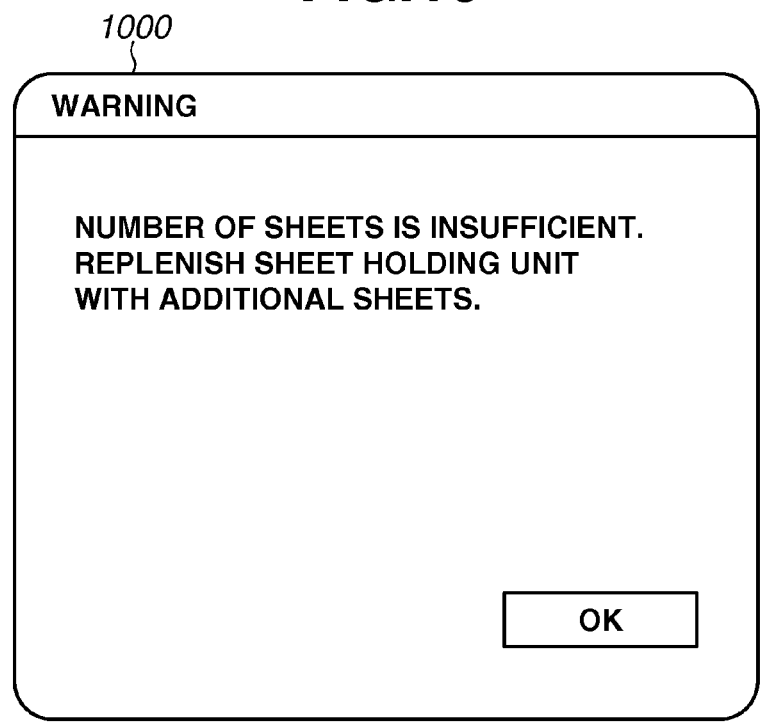

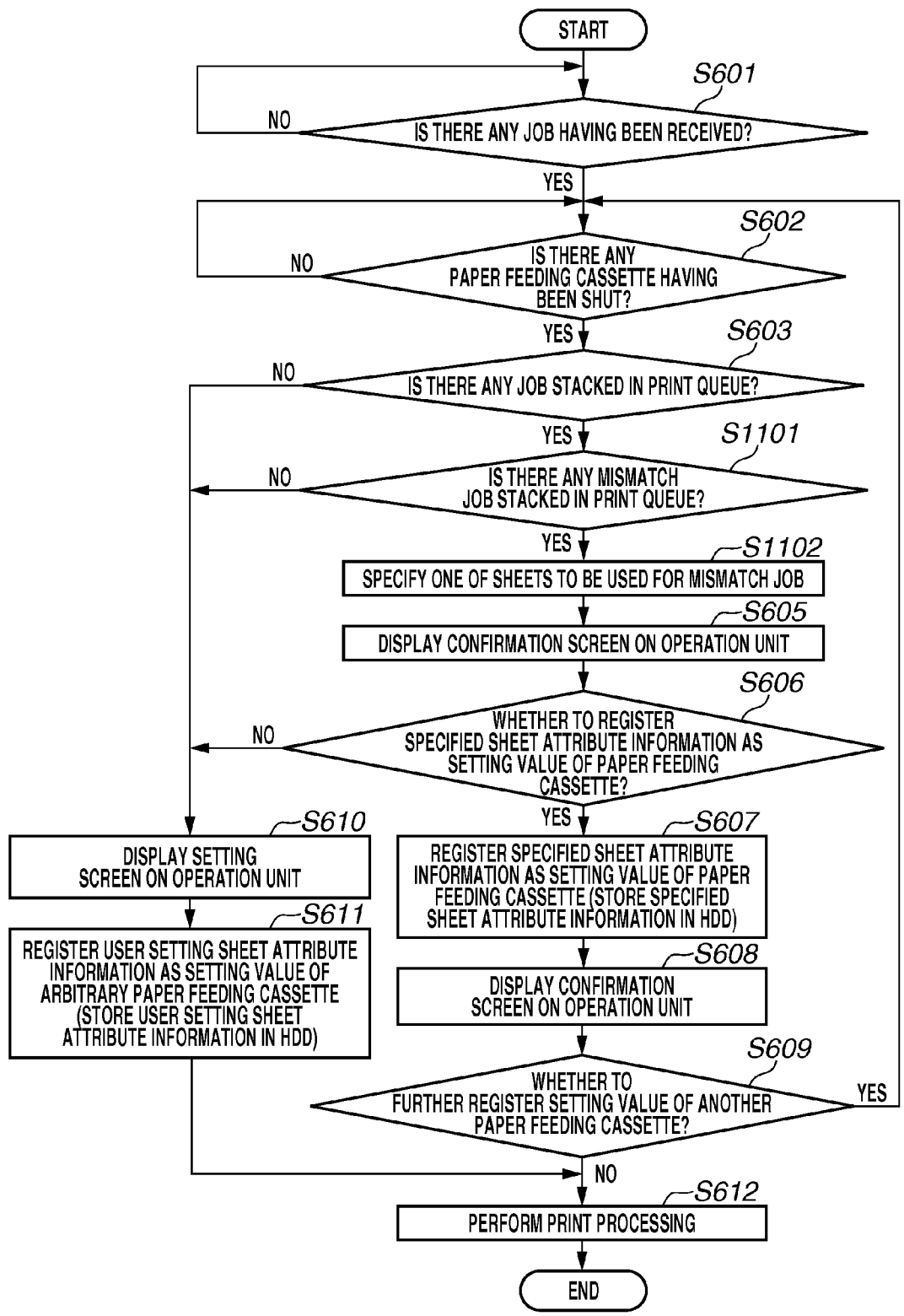

SHEET SELECTION

SELECT SHEET TO BE REGISTERED FOR PAPER FEEDING CASSETTE (MISMATCH SHEET).

A3 THICK PAPER (150 g/m$^2$)

A4 THICK PAPER (150 g/m$^2$)

A3 COATED PAPER (120 g/m$^2$)

OTHERS —*1201*

SHEET SELECTION

SELECT SHEET TO BE REGISTERED FOR PAPER FEEDING CASSETTE (MISMATCH SHEET, A4 SIZE).

A4 THICK PAPER (150 g/m$^2$)

OTHERS

PRINTING APPARATUS, PRINTING APPARATUS CONTROL METHOD, AND STORAGE MEDIUM TO REGISTER ATTRIBUTE INFORMATION ABOUT SHEETS FOR PRINT JOBS

BACKGROUND OF THE INVENTION

Field of the Invention

The present invention relates to a printing apparatus, a method for controlling the printing apparatus, and a storage medium.

Description of the Related Art

As a conventionally known technique, it is feasible for a printing apparatus to detect the size of a sheet stored in a paper feeding cassette with a sensor provided therein and automatically register the detected sheet size as a setting value of the paper feeding cassette. For example, providing a sensor capable of detecting the position of a sheet edge positioning guide is useful to detect the sheet size.

Further, as discussed in Japanese Patent Application Laid-Open No. 2009-15356, in a case where feeding a printing sheet from a manual bypass tray is designated when a printing apparatus performs a printing operation, it is conventionally feasible to overwrite or update the setting value of the manual bypass tray with a sheet type designated by a print job.

According to a conventional method, it is possible to register attribute information about a sheet designated by a job as a setting value of a sheet holding unit. However, a user may intend to execute a job using a plurality of types of sheets stored in different sheet holding units. In such a case, it is impossible to easily register attribute information about respective sheets stored in different sheet holding units as setting values.

SUMMARY OF THE INVENTION

According to an aspect of the present invention, a printing apparatus includes a storing unit configured to store a print job, an obtaining unit configured to obtain sheet attribute information designated by the print job stored in the storing unit, a detecting unit configured to detect an openable sheet holding unit being in a shut state, a display unit configured to display the sheet attribute information obtained by the obtaining unit in a case where the sheet holding unit is detected in the shut state by the detecting unit, and a setting unit configured to set the sheet attribute information displayed by the display unit for the shut state sheet holding unit in the case where the sheet holding unit is detected in the shut state by the detecting unit.

When a printing apparatus executes a job that uses a plurality of types of sheets stored in different sheet holding units, attribute information about the sheets stored in respective sheet holding units cannot be easily registered as setting values. The present invention provides a method for controlling a printing apparatus that includes a detecting unit configured to detect an openable sheet holding unit being in a shut state. The method includes storing a print job in a storing unit, obtaining sheet attribute information designated by a print job stored in the storing unit, detecting the openable sheet holding unit being in a shut state, displaying the obtained sheet attribute information on a displaying unit according as the shut sheet holding unit has been detected, and setting the sheet attribute information displayed by the displaying unit for the shut sheet holding unit having been detected by the detecting unit. Further features of the present invention will become apparent from the following description of exemplary embodiments with reference to the attached drawings.

BRIEF DESCRIPTION OF THE DRAWINGS

FIG. 3 illustrates an example of setting values registered for a paper feeding cassette according to a first exemplary embodiment.

FIG. 5 illustrates an example of jobs registered in a print queue according to the first exemplary embodiment.

FIG. 6 is a flowchart illustrating a control example according to the first exemplary embodiment.

FIGS. 8A and 8B illustrate confirmation screens according to the first exemplary embodiment.

FIGS. 9A and 9B illustrate setting screens according to the first exemplary embodiment.

FIG. 10 illustrates a warning screen according to the first exemplary embodiment.

FIG. 11 is a flowchart illustrating a control example according to a second exemplary embodiment.

FIGS. 12A and 12B illustrate selection screens according to the second exemplary embodiment.

DESCRIPTION OF THE EMBODIMENTS

Figure 1:
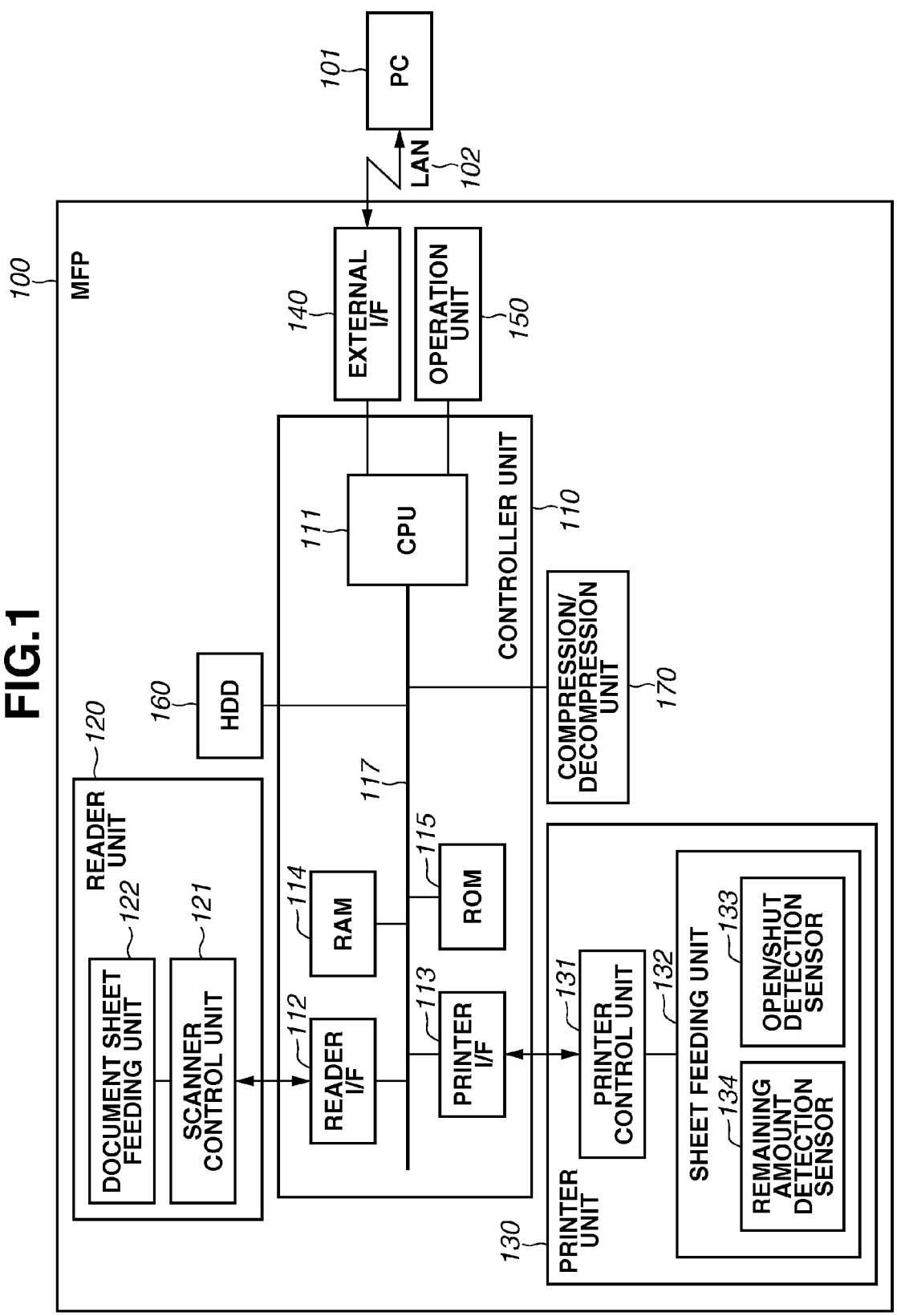
FIG. 1 is a block diagram illustrating a function configuration of a multi functional peripheral (MFP) according to the present exemplary embodiment.

Exemplary embodiments of the present invention will be described in detail below with reference to attached drawings. The following description of the exemplary embodiments does not intend to narrowly limit the scope of the present invention. Further, the description of characteristic features in each exemplary embodiment does not intend to specify all of combinations of these features as essential features of the present invention.

A printing system according to a first exemplary embodiment of the present invention is described in detail below with reference to FIG. 1.

In the first exemplary embodiment, the printing system can specify one of sheets to be used for a received job according as a sheet holding unit being in a shut state has been detected. The printing system can set attribute information about the specified sheet as attribute information about a sheet stored in the shut state detected sheet holding unit. Further, the printing system can control print processing based on the set sheet attribute information.

The printing system according to the present exemplary embodiment is described in detail below.

The printing system according to the present exemplary embodiment includes a multi functional peripheral (MFP) 100 and a personal computer (PC) 101. The MFP 100 is an example of a printing apparatus. The PC 101 is a computer that is functionally operable as an external information processing apparatus.

The MFP 100 has an image reading function capable of reading a document and generating image data and a print function (i.e., a copy function) capable of printing an image on a sheet based on the generated image data. Further, the MFP 100 has a PC print function capable of receiving a print job from an external apparatus (e.g., the PC 101) and printing characters and images on a sheet based on the print instruction data. The print function can be realized by a color or monochrome printing operation.

The MFP 100 is connected to the PC 101 via a local area network (LAN) 102. The MFP 100 can communicate with the PC 101.

In the present exemplary embodiment, the PC 101 can input a print job to the MFP 100 via the network (e.g., the LAN 102). The MFP 100 can process each print job input from the PC 101 via the network (e.g., the LAN 102).

Further, in the present exemplary embodiment, the MFP 100 and the PC 101 are connected with each other via the LAN 102. However, the MFP 100 and the PC 101 can be connected via a wide area network (WAN), such as Internet. Alternatively, the MFP 100 can be connected to the PC 101 via a universal serial bus (USB) cable. Further, the MFP 100 and the PC 101 can be configured to perform wireless communications with each other via a Wireless Fidelity (Wi-Fi) or Bluetooth (registered trademark) connection.

The PC 101 can generate image data with application software installed thereon and can transmit the generated image data to the MFP 100. In the present exemplary embodiment, the PC 101 is an example of the external information processing apparatus. However, the information processing apparatus is not limited to the PC 101 and can be a portable information terminal, such as a personal digital assistant (PDA) or a smartphone.

The MFP 100 according to the present exemplary embodiment includes a controller unit (i.e., a control unit) 110, a reader unit 120, a printer unit 130, an external I/F 140, an operation unit 150, a hard disk drive (HDD) 160, and a compression/decompression unit 170, which will be described below. The above-mentioned constituent units are electrically connected with each other via a system bus 117 to mutually transmit and receive control commands and data. Further, the external I/F 140 (i.e., an example of a communication unit) is an interface capable of transmitting and receiving image data to and from an external apparatus. The external apparatus is not limited to the PC 101 and can be, for example, a facsimile machine, a network connection device, or an external dedicated apparatus.

The reader unit 120 includes a scanner control unit 121 and a document feeding unit 122. The scanner control unit 121 is configured to control communications with the controller unit 110. The document feeding unit 122 is configured to feed a document. The controller unit 110 can instruct the reader unit 120 to perform a document reading operation via the scanner control unit 121. The reader unit 120 optically reads a document image and converts the read image into image data (i.e., an electric signal). In the present exemplary embodiment, the reader unit 120 is configured to receive a document reading instruction from the controller unit 110 via the scanner control unit 121 as described in detail below. However, in a case where the reader unit 120 of the MFP does not include any scanner control unit, the CPU 111 of the controller unit 110 can be configured to directly instruct the reader unit 120 to perform a document reading operation.

On the other hand, the printer unit 130 includes a printer control unit 131 and a sheet feeding unit 132. The printer control unit 131 is configured to control communications with the controller unit 110. The sheet feeding unit 132 is constituted by a plurality of paper feeding cassettes and a manual bypass tray, each of which can store sheets to be used in a printing operation. The sheet feeding unit 132 according to the present exemplary embodiment is not limited to the equipment of the above-mentioned paper feeding cassettes and manual bypass tray provided in the MFP 100. The sheet feeding unit 132 can be configured to include a paper feeding deck provided in a sheet feeding apparatus connected to the MFP 100.

Further, the printer unit 130 can perform print processing for a print target job stored in the HDD 160 of the controller unit 110. Each print target job is input from the HDD 160 to a queue (hereinafter, referred to as "print queue") when an execution instruction of the job is accepted in such a way as to successively execute a plurality of jobs. The print queue will be described in detail below with reference to FIG. 4B.

The printer control unit 131 of the printer unit 130 receives an image data print instruction from the controller unit 110. The printer unit 130 forms (prints) an image on a sheet fed from a sheet holding unit with toner particles based on the received image data and transfers and fixes the formed (printed) image. In the present exemplary embodiment, the printer control unit 131 of the printer unit 130 is configured to receive the image data print instruction from the controller unit 110 as described in detail below. However, in a case where the printer unit 130 of the MFP 100 does not include any printer control unit, the CPU 111 of the controller unit 110 can be configured to directly instruct the printer unit 130 to print the image data.

On the other hand, the controller unit 110 includes a nonvolatile memory (e.g., the HDD 160) provided therein, which can store a plurality of target jobs to be processed. The HDD 160 can store system software programs and image data compressed by the compression/decompression unit 170. In the present exemplary embodiment, the HDD 160 is an example of a massive and nonvolatile storage device. However, a solid state drive (SSD) or any other nonvolatile memory, if it is functionally operable as a massive and nonvolatile storage device, is employable.

The controller unit 110 has a plurality of functions. For example, the controller unit 110 can store image data of a document read by the reader unit 120 in the HDD 160. The controller unit 110 can execute a copy job by reading image data from the HDD 160 and causing the printer unit 130 to print an image on a sheet based on the read image data. Further, the controller unit 110 has a scanner function capable of converting image data of a document read by the reader unit 120 into code data and transmitting the obtained code data to the PC 101 (i.e., an external apparatus) via the external I/F 140 (i.e., an example of the communication unit). Further, the controller unit 110 can receive a print job from the PC 101 via the external I/F 140 and store the received print job in the HDD 160. Further, the controller unit 110 has a print function capable of converting code data read from the HDD 160 into image data and causing the printer unit 130 to print an image on a sheet based on the obtained image data.

Further, the controller unit 110 includes a read only memory (ROM) 115, a random access memory (RAM) 114, a reader I/F 112, and a printer I/F 113 in addition to the CPU 111.

The CPU 111 can control various units provided in the MFP 100 to perform various types of processing and operations. The ROM 115 stores boot sequence and font information related programs beforehand. On the other hand, the RAM 114, which is a readable and writable memory, stores image data received from the reader unit 120 and the external I/F 140, in addition to various programs, and setting information.

The ROM 115 or the HDD 160 can store control programs to be executed by the CPU 111 to realize various types of processing of flowcharts described in detail below. Further, the ROM 115 or the HDD 160 can store a display control program that controls a display unit of the operation unit 150 to display various user interface screens (hereinafter, referred to as "UI screens"). The CPU 111 can read programs from the ROM 115 or the HDD 160 and can load the read programs into the RAM 114 to perform various operations according to the present exemplary embodiment.

Further, the ROM 115 can store a program that causes the CPU 111 to interpret page description language (hereinafter, referred to as PDL) data received from an external apparatus via the external I/F 140 and rasterize the PDL data into raster image data (bitmap image data). Similarly, the ROM 115 can store a program that causes the CPU 111 to interpret a print job received from an external apparatus via the external I/F 140 and process the print job. The above-mentioned programs can be executed by the software.

The controller unit 110 can store (hold) processing target jobs input via various input units (e.g., the reader unit 120 and the external I/F 140) in the HDD 160. The controller unit 110 can read each processing target job from the HDD 160 and supply the processing target job to the printer unit 130. The printer unit 130 performs a printing operation based on the processing target job. Further, the controller unit 110 can perform a control in such a way as to read a job from the HDD 160 and transmit the read job to an external apparatus via the external I/F 140.

The compression/decompression unit 170 includes an image processing block that can perform processing for compressing and decompressing image data stored in the RAM 114 or the HDD 160 according to Joint Bi-level Image Experts Group (JBIG), Joint Photographic Experts Group (JPEG) or any appropriate compression methods and can store the processed image data again in the RAM 114. The image data compressed by the compression/decompression unit 170 can be transmitted to an external apparatus via the external I/F 140.

The controller unit 110 can receive image data from an external apparatus via the external I/F 140. The compression/decompression unit 170 can compress image data received via the external I/F 140 when the controller unit 110 stores the image data in the HDD 160. On the other hand, the compression/decompression unit 170 can decompress image data when the controller unit 110 causes the printer unit 130 to print an image on a sheet based on the image data stored in the HDD 160. Further, the controller unit 110 performs various types of outputting processing for processing target jobs stored in the HDD 160. Although in the present exemplary embodiment, each job is stored in the HDD 160. However, it is feasible to store a job in a volatile RAM.

The reader I/F 112 is an interface that can connect the controller unit 110 with the reader unit 120 (i.e., an image input device). The printer I/F 113 is an interface that can connect the controller unit 110 with the printer unit 130 (i.e., an image output device). The controller unit 110 can perform image data synchronous/asynchronous conversion and control processing via the reader I/F 112 and the printer I/F 113.

Further, the MFP 100 includes the operation unit 150 equipped with a display unit, which is an example of a user interface unit. The operation unit 150 of the MFP 100 according to the present exemplary embodiment includes hard keys in addition to the display unit although they are not illustrated in the drawings. The display unit is constituted by a liquid crystal display (LCD) device and a touch panel sheet integrated with transparent electrodes (or capacitance type electrodes) adhering to the surface of the LCD device. The LCD device can display various operation screens and operational states of the MFP 100. The operation unit 150 is functionally operable as a unit configured to accept various settings from users via the operation screens and the hard keys and provide required information to users.

Figure 2:
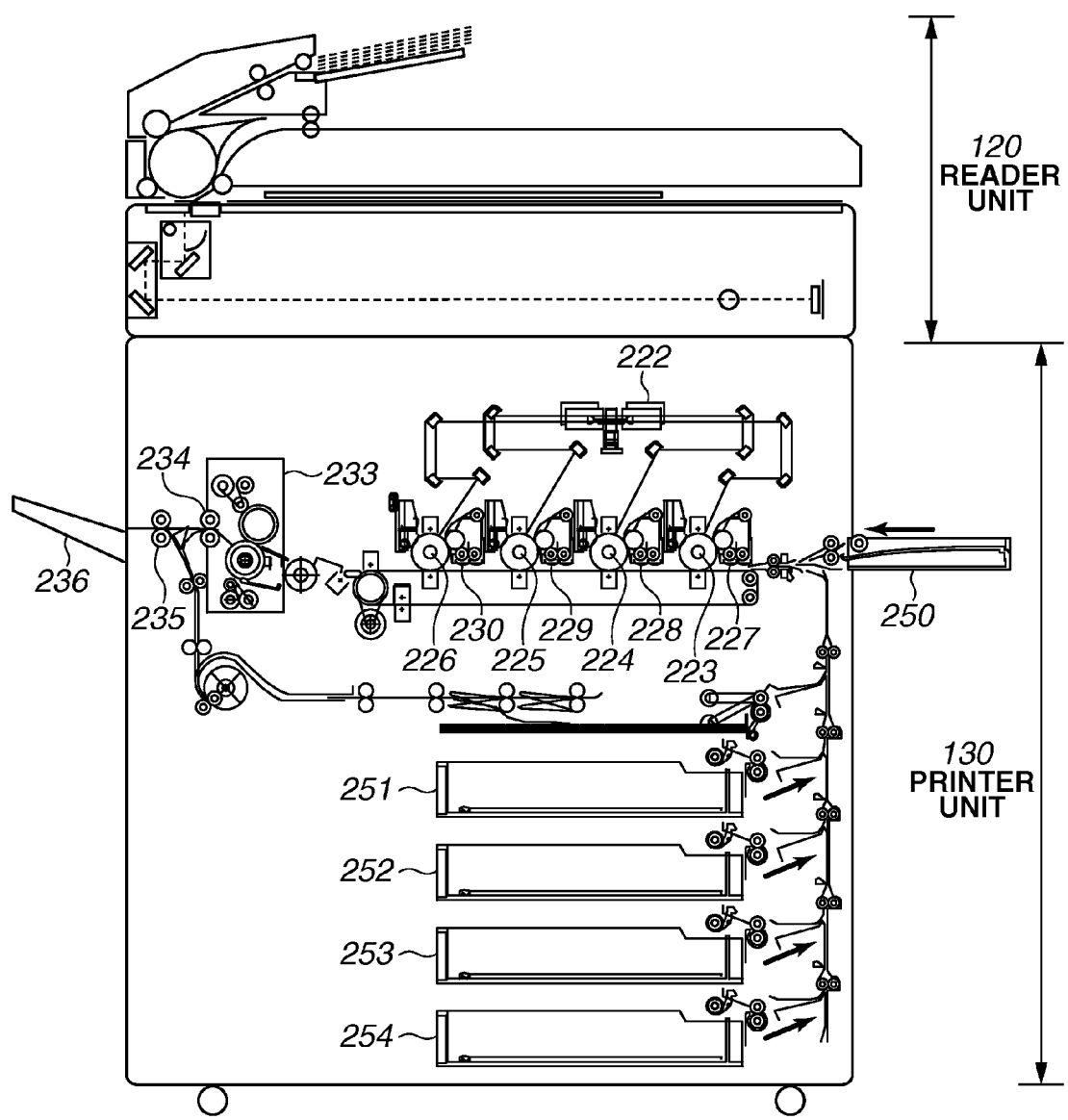
FIG. 2 is a cross-sectional view illustrating a configuration of the MFP according to the present exemplary embodiment.

FIG. 2 is a cross-sectional view of the reader unit 120 and the printer unit 130 illustrated in FIG. 1. An operation that can be performed by the printer unit 130 to print an image on a sheet based on transferred image data will be described in detail below.

A laser unit 222 can convert image data transferred to the printer unit 130 into a laser beam corresponding to the image data. Respective photosensitive drums 223 to 226 are irradiated with the laser beam so that a latent image corresponding to the laser beam can be formed on each of the photosensitive drums 223 to 226. Developing units 227 to 230 can cause developer to stick on the latent image portions on the corresponding photosensitive drums 223 to 226. If the MFP 100 is a color printing type, the printer unit 130 includes four sets of the photosensitive drum and the developing unit dedicated to cyan, yellow, magenta, and black colors.

Further, the printer unit 130 includes a plurality of paper feeding cassettes 251 to 254 and a manual bypass tray 250, each of which is operable as a sheet holding unit provided in the sheet feeding unit 132. Each of the respective paper feeding cassettes 251 to 254 has a drawer shape. Each of the respective paper feeding cassettes 251 to 254 includes an open/shut detection sensor 133 that can detect an open/shut operation of the corresponding paper feeding cassette. The printer unit 130 can include a plurality of manual bypass trays in addition to the plurality of paper feeding cassettes or can include at least one of the paper feeding cassettes and the manual bypass tray. The MFP 100 according to the present exemplary embodiment includes four paper feeding cassettes and only one manual bypass tray as illustrated in FIG. 2.

The respective paper feeding cassettes 251 to 254 can store a plurality of sheets (e.g., 600 sheets). Further, the manual bypass tray 250 can hold a plurality of sheets (e.g., 100 sheets). Each of the respective paper feeding cassettes 251 to 254 includes a remaining amount detection sensor 134 that can detect the amount of sheets remaining in the corresponding paper feeding cassette. For example, the remaining amount detection sensor 134 can discriminate three stages (e.g., full: 100%, small remaining amount: 25%, extremely small remaining amount: less than 5%, and zero remaining amount: 0%) with respect to the amount of sheets remaining in a paper feeding cassette. For example, the stage "full (100%)" indicates a state where 600 sheets remain in the paper feeding cassette. The stage "small remaining amount (25%)" indicates a state where 150 sheets remain in the paper feeding cassette. The stage "extremely small remaining amount (less than 5%)" indicates a state where less than 30 sheets remain in the paper feeding cassette. The stage "zero remaining amount (0%)" indicates a state where no sheet remains in the paper feeding cassette. If it is feasible to enhance the accuracy of the remaining amount detection by the remaining amount detection sensor 134, the amount of sheets remaining in each paper feeding cassette can be detected, for example, for every set of 25 sheets.

Further, each of the respective paper feeding cassettes 251 to 254 can further include a sensor capable of detecting the position of a sheet edge positioning guide to detect the size of a sheet stored in a paper feeding cassette. The size or sheet attribute information (e.g., grammage, color, surface nature, shape, and type) of a sheet stored in the paper feeding cassette or the manual bypass tray can be obtained when a user input its value via the operation unit 150 or can be imported from an external apparatus (e.g., the PC 101).

The size or sheet attribute information (e.g., grammage, color, surface nature, shape, and type) of a sheet stored in the paper feeding cassette or the manual bypass tray can be stored in the HDD 160 as a setting value of the paper feeding cassette or the manual bypass tray. For example, according to a paper feeding setting table 300 illustrated in FIG. 3 stored in the HDD 160, "A4 plain paper (grammage: 93 g/m$^2$)" is registered as a setting value of the cassette 1 and "A4 thick paper (grammage: 150 g/m$^2$)" is registered as a setting value of the cassette 2. On the other hand, a setting value of the cassette 3, a setting value of the cassette 4, and a setting value of the manual bypass tray are not registered. The remaining amount of sheets detected by the remaining amount detection sensor 134 can be registered in association with a corresponding paper feeding cassette in the paper feeding setting table 300.

The MFP 100 can control print processing based on the sheet attribute information stored in the HDD 160 as the setting value of the paper feeding cassette or the manual bypass tray. For example, the MFP 100 can determine a paper feeding cassette to be used in a printing operation with reference to the size of a print sheet to be used for a job and can control the determined paper feeding cassette to feed the required sheet. Further, the MFP 100 can control the temperature of each fixing device and the conveyance speed of each sheet based on the sheet grammage. Alternatively, the MFP 100 can control the temperature of each fixing device and the conveyance speed of each sheet based on the sheet type.

The printer unit 130 feeds a required sheet from any one of the paper feeding cassettes 251 to 254 and the manual bypass tray 250 and transfers the developer sticking on respective photosensitive drums 223 to 226 to the sheet. Subsequently, the printer unit 130 conveys the sheet to a fixing device 233 that can fix the developer to sheet by applying heat and pressure. Further, conveyance rollers 234 and 235 cooperatively discharge each processed sheet having passed through the fixing device 233 to a discharge tray 236.

Further, in a case where the MFP does not include any discharge tray (i.e., a sheet discharging unit), a sheet having passed through the fixing device 233 can be discharged to a predetermined portion in a casing thereof if it can serve as the sheet discharging unit.

The color MFP described in the present exemplary embodiment includes four photosensitive drums and four developing units. However, the present invention can be similarly employed for a monochrome printing machine that includes only one single photosensitive drum and only one single developing unit. Further, the method described in the present exemplary embodiment is characterized by electrophotographically printing an image on a sheet. However, any other appropriate method (e.g., an inkjet method) is employable to cause a printing machine to print an image on a sheet.

Subsequently, various function programs that can be executed by the MFP 100 will be described in detail below. Each function program can be stored in the HDD 160 and can be read and executed by the CPU 111 of the controller unit 110.

For example, a page description language (PDL) function program is stored beforehand in the HDD 160. When PDL data is received by the MFP 100 via the external I/F 140, the PDL function program causes the controller unit 110 to perform the print function.

Further, a User Interface (UI) function program is stored beforehand in the HDD 160. The UI function program is a control program for the operation unit 150. The UI function program causes the operation unit 150 to identify contents input by a user via the operation unit 150 and perform screen transition appropriately and instruct the controller unit 110 to perform required processing.

Although a part of the function programs is described in detail, it is unnecessary to store all of the function programs in the HDD 160. Further, the programs stored in the HDD 160 can be function programs other than a part of the function programs or the above-described function programs.

Various control programs required for the CPU 111 of the controller unit 110 to perform various processing of flowcharts described below are stored in the ROM 115 or the HDD 160. Further, the CPU 111 reads a stored program from the ROM 115 or the HDD 160 and loads the program into the RAM 114 to realize various operations according to the present exemplary embodiment.

Figure 4A:
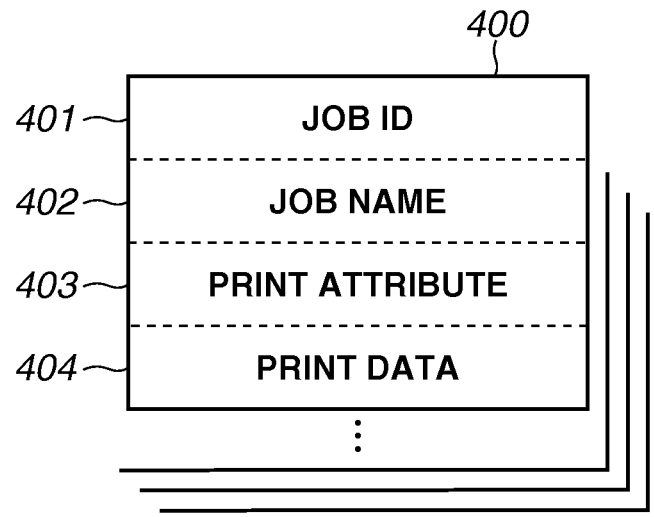
FIGS. 4A and 4B illustrate a data structure of a print job and a data structure of a print queue according to the first exemplary embodiment.

Subsequently, a data structure of a job according to the first exemplary embodiment is described in detail below with reference to FIG. 4A. An entry 400 illustrated in FIG. 4A is a structural example of each job entered to the MFP 100. The MFP 100 receives a print job from the PC 101 via the external I/F 140. If there is a plurality of jobs to be entered to and processed by the MFP 100, the number of entries 400 is equal to the total number of jobs. Each entry 400 is constituted by a job ID 401, a job name 402, a print attribute 403, and print data 404. The job ID 401 of the entry 400 is a unique ID allocated to each job in the MFP 100 and can be used to identify and specify each job. The print attribute 403 of the entry 400 includes print attribute information defined by the job. The print attribute information includes a job entry user name, job sheet size, and sheet attribute information (e.g., size, grammage, color, and type). The print attribute information further includes information about a job sheet feeding cassette (or tray) in addition to information about the number of pages. Further, the print data 404 of the entry 400 includes data of an image to be rendered on a print sheet.

Figure 4B:
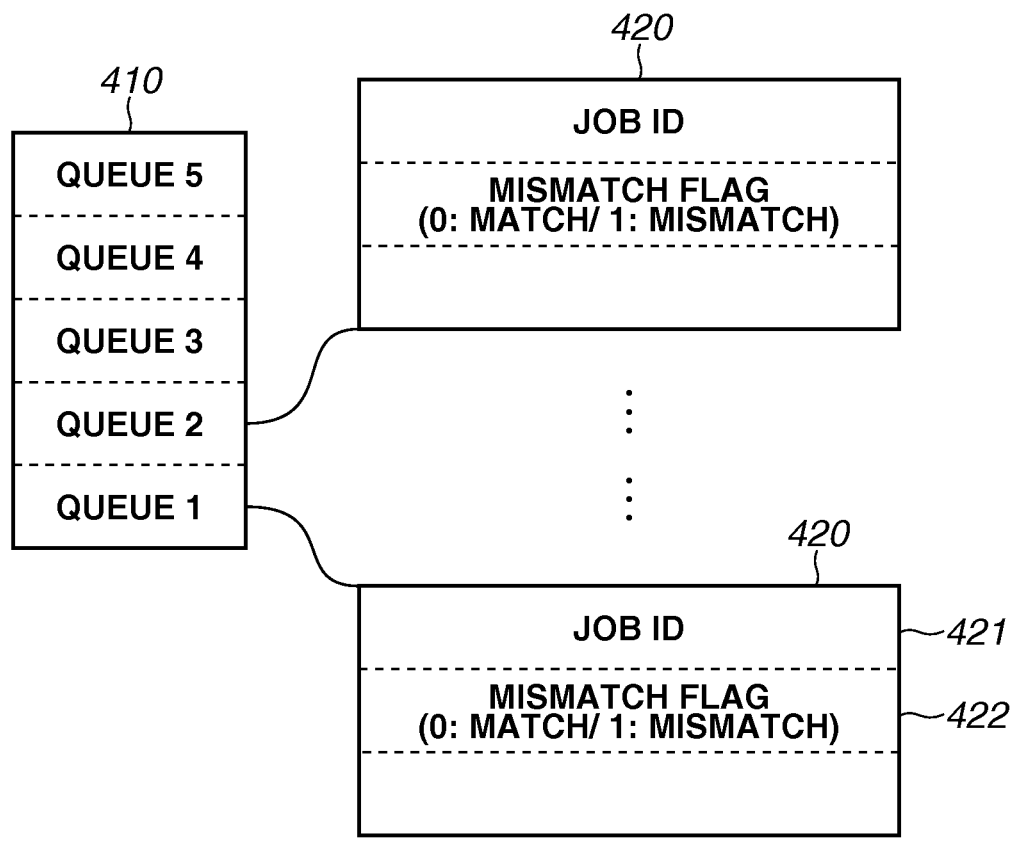

Subsequently, a data structure of a print queue according to the first exemplary embodiment is described in detail below with reference to FIG. 4B. A print queue 410 can manage each job entered in the MFP 100 after print settings of the job have been analyzed. If a first job is entered to the print queue 410 in a state where no job is present in the print queue 410, the entered job is stacked in a queue 1 of the print queue 410. Subsequently, if the next job is entered, the entered job is stacked in a queue 2 of the print queue 410.

If there is a plurality of jobs managed by the print queue 410, the print processing of these jobs is successively performed in ascending order of the queue number. More specifically, the status of a job stacked in the queue 1 becomes "print processing in progress." On the other hand, the status of each job stacked in the queue 2, the queue 3, the queue 4, or the queue 5 becomes "print standby." Each job is deleted from the print queue 410 when the printing of the job has been completed. Therefore, the jobs remaining in the print queue 410 are restacked such that the job order is advanced. Then, the print processing of the job stacked in the queue 1 is performed. Although the example illustrated in FIG. 4B includes only five queues, it is useful to prepare an appropriate number of queues considering the memory capacity or the print processing speed of the MFP 100.

An attribute table 420 can manage attribute information about each job stacked in the queue of the print queue 410. The attribute table 420 is constituted by a job ID 421 and a mismatch flag 422. The job ID 421 is information to be referred to in identifying each job. The mismatch flag 422 identifies a mismatch state.

The mismatch state is a state where execution of a job is interrupted because of the absence of a sheet to be used. It is determined that there is not any sheet to be used when the sheet size or the sheet attribute information (e.g., grammage, color, and type) designated by a job does not coincide with the sheet attribute information registered for each sheet holding unit. Further, even when the sheet size or the sheet attribute information (e.g., grammage, color, and type) designated by the job coincides with the sheet attribute information registered for any one of the sheet holding units, it is determined that there is not any sheet to be used if the number of sheets stored in the corresponding sheet holding unit is insufficient.

If the state is not a mismatch state, "0: match" is stored as a value of the mismatch flag 422. On the other hand, if the state is the mismatch state, "1: mismatch" is stored as the value of the mismatch flag 422.

The print data 404 is not present in the attribute table 420 because respective jobs stacked in the print queue 410 can refer to the print data 404 in the entry 400 illustrated in FIG. 4A. In the present exemplary embodiment, the print data 404 is not present in the attribute table 420, as described below. However, the attribute table 420 can include copy print data that represents the entity of each job. Each job searches every entry 400 to check the presence of the job ID 401 whose value is identical to that of the job ID 421 and then obtains the print attribute 403 and the print data 404 from the entry 400 identified by the job ID 401 having the value identical to that of the job ID 421.

An example of the jobs stacked in the print queue 410 will be described in detail below with reference to a job table 500 illustrated in FIG. 5 stored in the HDD 160. The job table 500 is similar to the paper feeding setting table 300 illustrated in FIG. 3 in that setting values of respective paper feeding cassettes are registered and stored in the HDD 160.

The job table 500 illustrated in FIG. 5 is constituted by the job ID 401(421), the job name 402, status (e.g., print processing in progress or print standby), the print attribute 403, and the mismatch flag 422.

For example, a value being set for the mismatch flag 422 of the first job (i.e., Job A) stacked in the queue 1 of the print queue 410 is "0: match", because "A4 plain paper" designated by the Job A is registered as a setting value of the cassette 1. Further, the number of "A4 plain papers" stored in the cassette 1 is 200. Therefore, the number of sheets is sufficient. On the other hand, a value being set for the mismatch flag 422 of the second job (i.e., Job B) stacked in the queue 2 of the print queue 410 is "1: mismatch", because the number of sheets is insufficient. More specifically, although "A4 thick paper" designated by the Job B is registered as a setting value of the cassette 2, there is not any "A4 thick paper" stored in the cassette 2. On the other hand, a value being set for the mismatch flag 422 of the third job (i.e., Job C) stacked in the queue 3 of the print queue 410 is "1: mismatch", because "A3 thick paper" designated by the Job C is not registered as a setting value of any paper feeding cassette.

Subsequently, sequential processing that can be performed by the MFP 100 according to the first exemplary embodiment to register sheet attribute information designated by a received job as a setting value of the paper feeding cassette will be described in detail below with reference to a flowchart illustrated in FIG. 6. To attain the above-mentioned processing, the CPU 111 of the controller unit 110 executes the PDL function program loaded from the ROM 115 or the HDD 160 into the RAM 114. In the following description, it is assumed that respective setting values of the paper feeding cassettes are registered preliminarily as indicated by the paper feeding setting table 300 illustrated in FIG. 3 before starting the sequential processing illustrated in FIG. 6.

In step S601, the CPU 111 determines whether there is any job received from an external apparatus (e.g., the PC 101) via the external I/F 140. If the CPU 111 determines that there is a received job (YES in step S601), the operation proceeds to step S602. Otherwise (NO in step S601), the CPU 111 repeats the processing in step S601 until a job is received.

In step S602, the CPU 111 determines whether a paper feeding cassette has been shut. In this case, the CPU 111 can detect the paper feeding cassette being in a shut state based on a signal obtained from the open/shut detection sensor 133. If the CPU 111 determines that the paper feeding cassette has been shut (YES in step S602), the operation proceeds to step S603. Otherwise (NO in step S602), the CPU 111 repeats the processing in step S602 until the open/shut detection sensor 133 detects a paper feeding cassette having been shut.

In step S603, the CPU 111 determines whether there is any job stacked in the print queue 410. If the CPU 111 determines that at least one job is stacked (YES in step S603), the operation proceeds to step S604. On the other hand, if the determination result in step S603 is NO, the operation proceeds to step S610.

In step S604, the CPU 111 specifies one of sheets to be used for the job stacked in the print queue 410. Subsequently, the operation proceeds to step S605. In specifying one of sheets to be used for the target job in step S604, the CPU 111 can exclude any job whose status is "print processing in progress" and select as a processing target only jobs whose status is "print standby", from among jobs stacked in the print queue 410.

If the usage of only one sheet is designated for a job stacked in the print queue 410, then in step S604, the CPU 111 specifies the designated sheet. On the other hand, if the usage of a plurality of sheets is designated for a job stacked in the print queue 410, then in step S604, the CPU 111 can specify a sheet to be initially fed among the plurality of sheets. For example, in the job table 500 illustrated in FIG. 5, the sheets to be used for Job A, Job B, Job C, Job D, and Job E stacked in the print queue 410 are "A4 plain paper", "A4 thick paper", "A3 thick paper", "A3 coated paper", and "A4 plain paper", respectively. In this case, the CPU 111 specifies the "A4 plain paper" to be initially fed for the Job A.

Figure 7A:
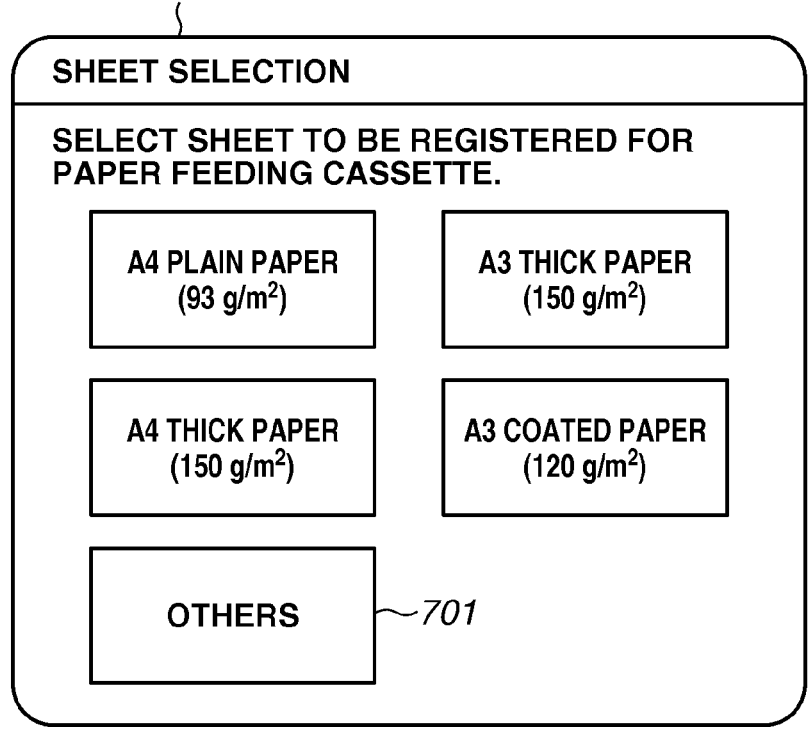
FIGS. 7A and 7B illustrate selection screens according to the first exemplary embodiment.
Figure 7B:
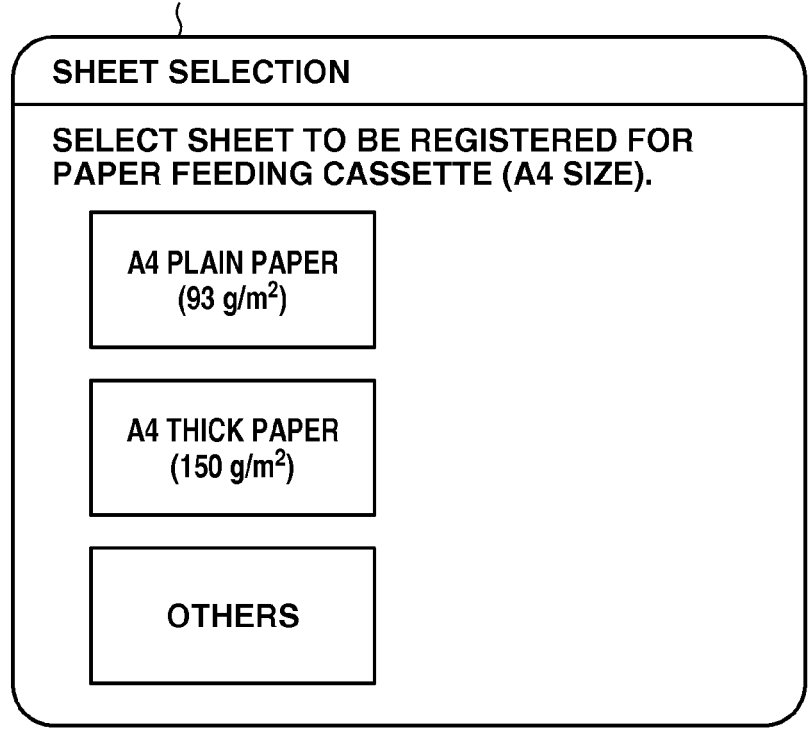

Alternatively, if there is a plurality of sheets to be used for a job stacked in the print queue 410, then in step S603, the CPU 111 can cause the operation unit 150 to display a selection screen 700 illustrated in FIG. 7A that explicitly shows a plurality of sheet type candidates. A user can arbitrarily select a desired sheet type from the selection screen 700 so that the selected sheet type can be registered as a setting value of the shut paper feeding cassette determined in step S602. Then, the CPU 111 can specify sheet attribute information that can be determined by the sheet type selected by the user. However, in a case where a user favorite sheet type is not displayed on the selection screen 700 as a candidate, the user can press another button 701 on the selection screen 700. If the others button 701 is pressed, the operation proceeds to step S610 described below. If a sensor capable of detecting the size of a sheet stored in each paper feeding cassette is available, it is feasible to reduce the number of the sheet type candidates beforehand based on the sheet size stored in the shut paper feeding cassette determined in step S602. Then, in step S604, the CPU 111 can cause the operation unit 150 to display a selection screen 710 illustrated in FIG. 7B that explicitly shows a plurality of sheet type candidates.

In step S605, the CPU 111 causes the operation unit 150 to display a confirmation screen 800 illustrated in FIG. 8A. The operation proceeds to step S606. The confirmation screen 800 enables a user to confirm whether to register the sheet attribute information specified in step S604 as the setting value of the shut paper feeding cassette determined in step S602.

In step S606, the CPU 111 determines whether to register the sheet attribute information specified in step S603 as the setting value of the shut paper feeding cassette determined in step S602. If the user presses an OK button 801 on the confirmation screen 800, the CPU 111 determines that the CPU 111 registers the sheet attribute information specified in step S604 as the setting value of the paper feeding cassette. On the other hand, if the user presses a cancel button 802 on the confirmation screen 800, the CPU 111 determines that the CPU 111 does not register the specified sheet attribute information as the setting value of the paper feeding cassette. If the CPU 111 determines that the CPU 111 registers the specified sheet attribute information (YES in step S606), the operation proceeds to step S607. On the other hand, if the determination result in step S606 is NO, the operation proceeds to step S610.

In step S607, the CPU 111 registers the sheet attribute information specified in step S604 as the setting value of the shut paper feeding cassette determined in step S602. In other words, the CPU 111 stores the specified sheet attribute information in the HDD 160. Subsequently, the operation proceeds to step S608. For example, if the shut state of the "cassette 4" is detected in step S602 and "A4 plain paper (grammage: 93 g/m$^2$)" is specified in step S604, then in step S607, the CPU 111 registers "A4 plain paper (grammage: 93 g/m$^2$)" as the setting value of the cassette 4.

In step S608, the CPU 111 causes the operation unit 150 to display a confirmation screen 810 illustrated in FIG. 8B. Subsequently, the operation proceeds to step S609. The confirmation screen 810 is a screen that enables each user to confirm whether to further register a setting value of another paper feeding cassette.

In step S609, the CPU 111 determines whether to further register a setting value of another paper feeding cassette. If the user presses an OK button 811 on the confirmation screen 810, the CPU 111 determines that the CPU 111 further registers a setting value of another paper feeding cassette. On the other hand, if the user presses a cancel button 812 on the confirmation screen 810, the CPU 111 does not register any setting value of another paper feeding cassette. If the CPU 111 determines that the CPU 111 registers the setting value of another paper feeding cassette (YES in step S609), the operation returns to step S602 to repeat the above-mentioned processing. On the other hand, if the determination result in step S609 is NO, the operation proceeds to step S612.

In step S610, the CPU 111 causes the operation unit 150 to display a setting screen 900 illustrated in FIG. 9A. Subsequently, the operation proceeds to step S611. The setting screen 900 enables each user to set attribute information about sheets stored in respective paper feeding cassettes as setting values of the paper feeding cassettes. The user can select an arbitrary paper feeding cassette on the setting screen 900. Further, the user can press a setting button 901 to call a setting screen 910 illustrated in FIG. 9B. The setting screen 910 illustrated in FIG. 9B enables each user to arbitrarily set, for example, the sheet size and the sheet type as setting values of the selected paper feeding cassette.

In step S611, the CPU 111 registers the sheet attribute information set by the user that is specified on the setting screen 910 illustrated in FIG. 9B as the setting values of an arbitrary paper feeding cassette. In other words, the CPU 111 stores the set sheet attribute information in the HDD 160. Subsequently, the operation proceeds to step S612. For example, the user selects the "cassette 4" on the setting screen 900 and selects the "A4" and "coated paper" on the setting screen 910. In this case, the CPU 111 registers the "A4 coated paper (grammage: 120 g/m$^2$)" as a setting value of the cassette 4. The sheet grammage can be uniquely determined based on a combination of a sheet size and a sheet type. Alternatively, the sheet grammage can be a user input value.

In step S612, the CPU 111 causes the printer unit 130 to perform print processing by controlling the fixing device temperature and the sheet conveyance speed in the printing apparatus based on the sheet attribute information (e.g., grammage) registered as the setting value of the paper feeding cassette in step S607 or in step S611. After completing the processing in step S612, the CPU 111 terminates the sequential processing of the flowchart illustrated in FIG. 6.

As mentioned in detail above, the MFP 100 according to the first exemplary embodiment can perform sequential processing for registering sheet attribute information designated by a received job, as a setting value of the paper feeding cassette.

In a case where the number of sheets stored in the shut paper feeding cassette determined in step S602 is less than the number of sheets to be used for a job, the print processing may stop halfway because of the absence of a sheet to be used. Therefore, when the number of sheets stored in the paper feeding cassette is less than the number of sheets to be used in the job, the CPU 111 can cause the operation unit 150 to display a warning screen 1000 illustrated in FIG. 10 that prompts the user to replenish the paper feeding cassette with additional (sufficient) sheets before the printer unit 130 starts the print processing.

In the above-mentioned exemplary embodiment, if the CPU 111 determines that there is not any job stacked in the print queue 410 (NO in step S603), the operation proceeds to step S608. However, the processing to be performed by the CPU 111 is not limited to the above-mentioned example. For example, if there is a hold job (i.e., a job stacked in a specific queue that temporarily stores jobs in the HDD 160) even when the CPU 111 determines that there is not any job stacked in the print queue 410, the operation can proceed to step S604. Further, if there is a reservation job (i.e., a job stacked in a specific queue that temporarily stores jobs in the HDD 160 to enable a user to input an intended job to the print queue 410 at time designated beforehand), the operation can proceed to step S604. In this case, in step S604, the CPU 111 specifies one of sheets to be used for the hold job or the reservation job and then performs the processing in step S605 and subsequent steps.

As mentioned above, the MFP 100 according to the first exemplary embodiment specifies one of sheets to be used for a job stacked in the print queue 410 when a shut paper feeding cassette has been detected. Further, the MFP 100 can easily register attribute information about the specified sheet as a setting value of the shut paper feeding cassette. Therefore, the MFP 100 can perform printing based on the sheet attribute information registered as the setting value of the shut paper feeding cassette.

In the above-mentioned first exemplary embodiment, each paper feeding cassette is a processing target of the sequential processing illustrated in FIG. 6. However, the manual bypass tray or the paper feeding deck can be another processing target of the sequential processing illustrated in FIG. 6.

As mentioned above, the first exemplary embodiment exerts desirable effects in registering attribute information about a sheet to be used for a job registered in the print queue 410 for a sheet holding unit whose setting value is not yet registered in a state where there is not any sheet stored in the sheet holding unit.

Further, in a state where a plurality of jobs is stacked in the print queue 410, sheet attribute information designated by each of the plurality of jobs can be successively registered as setting values of respective paper feeding cassettes. Therefore, the user operability can be greatly improved. Similarly, in a case where a plurality of sheets is designated by a job stacked in the print queue 410, attribute information about the plurality of sheets designated by the job can be successively registered as setting values of the plurality of paper feeding cassettes. Therefore, the user operability can be greatly improved.

A second exemplary embodiment will be described in detail below. The printing apparatus according to the above-mentioned first exemplary embodiment specifies one of sheets to be used for a job stacked in the print queue 410 when a paper feeding cassette having been shut is detected. Then, the printing apparatus registers attribute information about the specified sheet as a setting value of the shut paper feeding cassette.

On the other hand, in a case where a mismatch job stacked in the print queue 410 is executed, the print processing may stop halfway because of the absence of a sheet to be used. Therefore, to prevent the print processing from being interrupted, it is necessary to preliminarily register attribute information about a sheet to be used for a mismatch job as a setting value of an arbitrary paper feeding cassette.

In view of the foregoing, a printing apparatus according to the second exemplary embodiment is characterized by specifying one of sheets to be used for a job being in a mismatch state registered in the print queue 410 in response to the detection of a paper feeding cassette having been shut. Further, the printing apparatus according to the second exemplary embodiment is characterized by registering attribute information about the specified sheet as a setting value of the paper feeding cassette, as described in detail below.

The second exemplary embodiment is partly different from the first exemplary embodiment (FIG. 6) in the sequential processing to be performed by the MFP 100 to register sheet attribute information designated by a received job as a setting value of a paper feeding cassette. Therefore, processing contents that are not described in the first exemplary embodiment will be chiefly described in detail below with reference to FIG. 11. Processing similar to that in the first exemplary embodiment is designated by the same step number and redundant description thereof will be avoided.

In the following description, it is assumed that respective setting values of the paper feeding cassettes are registered preliminarily as indicated by the paper feeding setting table 300 illustrated in FIG. 3 before starting the sequential processing illustrated in FIG. 11.

In step S603, the CPU 111 determines whether there is any job stacked in the print queue 410. If the CPU 111 determines that there is a stacked job (YES in step S603), the operation proceeds to step S1101.

In step S1101, the CPU 111 determines whether there is any mismatch job stacked in the print queue 410. If the CPU 111 determines that at least one mismatch job is present (YES in step S1101), the operation proceeds to step S1102. On the other hand, if the determination result in step S1101 is NO, the operation proceeds to step S610. In this case, the CPU 111 can check the presence of any mismatch job stacked in the print queue 410 by referring to the value of the mismatch flag 422 managed by the attribute table 420 illustrated in FIG. 4.

In step S1102, the CPU 111 specifies one of sheets to be used for the mismatch job stacked in the print queue 410.

If the usage of only one sheet is designated for a mismatch job, then in step S1102, the CPU 111 specifies the designated sheet. On the other hand, if the usage of a plurality of sheets is designated for a mismatch job, then in step S1102, the CPU 111 can specify a sheet to be initially fed among the plurality of sheets. For example, in the job table 500 illustrated in FIG. 5, the sheets to be used for respective mismatch jobs (i.e., Job B, Job C, and Job D) are "A4 thick paper", "A3 thick paper", and "A3 coated paper." In this case, the CPU 111 specifies the "A4 thick paper" to be initially fed for the Job B.

Alternatively, if the usage of a plurality of sheets is designated for a mismatch job, then in step S1102, the CPU 111 can cause the operation unit 150 to display a selection screen 1200 illustrated in FIG. 12A that explicitly shows a plurality of sheet type candidates. A user can arbitrarily select desired sheet attribute information from the selection screen 1200 so that the selected sheet attribute information can be registered as a setting value of the shut paper feeding cassette determined in step S602. Then, the CPU 111 can specify sheet attribute information that can be determined by the sheet type selected by the user. However, in a case where a user favorite sheet type is not displayed as a candidate on the selection screen 1200, the user can press another button 1201 on the selection screen 1200. If the another button 1201 is pressed, the operation proceeds to step S610 to perform subsequent processing. If a sensor capable of detecting the size of a sheet stored in the paper feeding cassette is available, it is feasible to reduce the number of the sheet type candidates beforehand based on the sheet size stored in the shut paper feeding cassette determined in step S602. Then, in step S1102, the CPU 111 can cause the operation unit 150 to display a selection screen 1210 illustrated in FIG. 12B that explicitly shows a plurality of sheet type candidates.

After completing the processing in step S1102, the CPU 111 performs processing in step S605 and subsequent steps.

As mentioned in detail above, the MFP 100 according to the second exemplary embodiment can perform the sequential processing for registering sheet attribute information designated by a received job as a setting value of a paper feeding cassette, which is different from the sequential processing described in the first exemplary embodiment.

As mentioned above, the printing apparatus according to the second exemplary embodiment specifies one of sheets to be used for a mismatch job stacked in the print queue 410 in response to the detection of a shut paper feeding cassette. Further, the printing apparatus can easily register attribute information about the specified sheet as a setting value of the shut paper feeding cassette. Therefore, the printing apparatus can perform printing based on the sheet attribute information registered as the setting value of the shut paper feeding cassette. As mentioned above, the second exemplary embodiment exerts desirable effects in registering attribute information about a sheet to be used for a mismatch job for a sheet holding unit whose setting value is not yet registered in a state where there is not yet any sheet stored in the sheet holding unit.

The present invention is not limited to the above-mentioned exemplary embodiments. Various modifications (including any possible combination of the exemplary embodiments) can be realized according to the aspect of the present invention. The present invention encompasses all of such modifications.

For example, in the above-mentioned exemplary embodiment, the CPU 111 of the controller unit 110 chiefly performs the above-mentioned various controls to be realized by the MFP 100. However, a print controlling apparatus (e.g., an external controller), which is an external device independent of the MFP 100, can be configured to perform a part or the whole of the above-mentioned various controls.

Further, in the above-mentioned exemplary embodiment, each job entered in a print queue that is provided to successively execute a plurality of jobs is a processing target of the above-mentioned various controls. However, the processing target is not limited to the above-mentioned example. For example, a print scheduled job (i.e., a print-ready job) temporarily stored in the HDD 160 can be a processing target in performing a part or the whole of the above-mentioned various controls.

Although the present invention has been described with reference to various examples and exemplary embodiments, the scope of the present invention is not limited to specific contents of the disclosure.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083595 filed Apr. 15, 2014, which is hereby incorporated by reference herein in its entirety.

What is claimed is:

1. A printing apparatus comprising:
    at least one processor coupled to a memory;
    a storing unit configured to store a print job;
    an obtaining unit configured to obtain sheet attribute information designated by the print job stored in the storing unit;
    a detecting unit configured to detect that a sheet holding unit has been closed, wherein the sheet holding unit is openable and closable;
    a display unit configured to display at least one candidate of sheet attribute information based on the sheet attribute information obtained by the obtaining unit in a case where the detecting unit detected that the sheet holding unit has been closed;
    a receiving unit configured to receive, from a user, an instruction for setting a designated sheet attribute information from the at least one candidate of sheet attribute information displayed by the displaying unit;
    a setting unit configured to set, based on the instruction received by the receiving unit, the designated sheet attribute information for the sheet holding unit; and
    a printing unit configured to print, based on the designated sheet attribute information set by the setting unit, an image on a sheet which is conveyed from the sheet holding unit,
    wherein the obtaining unit, the detecting unit, the receiving unit, and the setting unit are implemented by the at least one processor.

2. The printing apparatus according to claim 1, further comprising a selecting unit,
    wherein the obtaining unit obtains sheet attribute information of a plurality of sheets, wherein the sheet attribute information of the plurality of sheets is designated by the print job stored in the storing unit,
    wherein the display unit displays a least one candidate of sheet attribute information of the plurality of sheets in a case where the detecting unit detected that the sheet holding unit has been closed, wherein the sheet attribute information of the plurality of sheets is obtained by the obtaining unit,
    wherein the selecting unit is configured to select sheet attribute information of a sheet from among the at least one candidate of sheet attribute information of the plurality of sheets, wherein the at least one candidate of sheet attribute information of the plurality of sheets is displayed by the display unit,
    wherein the receiving unit receives, from the user, the instruction for setting the sheet attribute information of the sheet, wherein the sheet attribute information of the sheet is selected by the selecting unit for the sheet holding unit, and
    wherein the setting unit sets, based on the instruction received by the receiving unit, the designated sheet attribute information of the sheet for the sheet holding unit, wherein the designated sheet attribute information of the sheet is selected by the selecting unit.

3. The printing apparatus according to claim 1, wherein the obtaining unit obtains sheet attribute information of a plurality of sheets, wherein the sheet attribute information of the plurality of sheets is designated by the print job stored in the storing unit, the printing apparatus further comprising:

a size detecting unit implemented by the at least one processor and configured to detect a sheet size of a sheet stored in the sheet holding unit; and a specifying unit configured to specify, from among the sheet attribute information of the plurality of sheets, sheet attribute information of a sheet including the sheet size detected by the size detecting unit, wherein the sheet attribute information of the plurality of sheets is obtained by the obtaining unit, and wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

4. The printing apparatus according to claim 1, further comprising:

a specifying unit, wherein the obtaining unit obtains sheet attribute information of a plurality of sheets, wherein the sheet attribute information of the plurality of sheets is designated by the print job stored in the storing unit, wherein the specifying unit is configured to specify, from among the sheet attribute information of the plurality of sheets, the sheet attribute information of a sheet to be initially used in the print job stored in the storing unit, wherein the sheet attribute information of the plurality of sheets is obtained by the obtaining unit, and wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

5. The printing apparatus according to claim 1, wherein the obtaining unit obtains sheet attribute information of a plurality of sheets, wherein the sheet attribute information of the plurality of sheets is designated by the print job stored in the storing unit, the printing apparatus further comprising:

a determining unit implemented by the at least one processor and configured to determine whether the sheet attribute information of the plurality of sheets is already set as attribute information of a sheet stored in the sheet holding unit, wherein the sheet attribute information of the plurality of sheets is obtained by the obtaining unit; and a specifying unit implemented by the at least one processor and configured to specify, from among the sheet attribute information of the plurality of sheets, sheet attribute information of a sheet that is determined by the determining unit and is not yet set as attribute information of a sheet stored in the sheet holding unit, wherein the sheet attribute information of the plurality of sheets is obtained by the obtaining unit, and wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

6. The printing apparatus according to claim 1, further comprising a specifying unit implemented by the at least one processor, wherein the obtaining unit obtains sheet attribute information of a plurality of sheets, wherein the sheet attribute information of the plurality of sheets is designated by the print job stored in the storing unit, wherein the specifying unit is configured to specify, from among the sheet attribute information of the plurality of sheets, sheet attribute information of a sheet to be used for the print job stored in the storing unit, amount of the sheet being insufficient for the print job stored in the storing unit, wherein the sheet attribute information of the plurality of sheets is obtained by the obtaining unit, and wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

7. The printing apparatus according to claim 1, wherein the sheet attribute information includes at least one of a sheet size, a sheet grammage, and a sheet type.

8. The printing apparatus according to claim 1, wherein the sheet holding unit is a paper feeding cassette, a manual bypass tray, or a paper feeding deck.

9. The printing apparatus according to claim 1, further comprising:

a specifying unit, wherein the obtaining unit obtains sheet attribute information of a plurality of sheets, wherein the sheet attribute information of the plurality of sheets is designated by the print job stored in the storing unit, wherein the specifying unit is configured to specify, from among the sheet attribute information of the plurality of sheets, wherein the sheet attribute information of the plurality of sheets is obtained by the obtaining unit, and wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

10. The printing apparatus according to claim 1, further comprising a selecting unit, wherein the obtaining unit obtains sheet attribute information of a plurality of sheets, wherein the sheet attribute information of the plurality of sheets is designated by the print job stored in the storing unit, wherein the display unit displays at least one candidate of sheet attribute information of the plurality of sheets in a case where the detecting unit detected that the sheet holding unit has been closed, wherein the sheet attribute information of the plurality of sheets is obtained by the obtaining unit, wherein the selecting unit is configured to select sheet attribute information of a sheet from among the at least one candidate of sheet attribute information of the plurality of sheets, wherein the at least one candidate of sheet attribute information of the plurality of sheets is displayed by the display unit, wherein the receiving unit receives, from the user, the instruction for setting the sheet attribute information of the sheet, wherein the sheet attribute information of the sheet is selected by the selecting unit for the sheet holding unit, and wherein the setting unit sets, based on the instruction received by the receiving unit, the designated sheet attribute information of the sheet for the sheet holding unit, wherein the designated sheet attribute information of the sheet is selected by the selecting unit.

11. The printing apparatus according to claim 1, wherein the obtaining unit obtains sheet attribute information of a plurality of sheets, wherein the sheet attribute information of the plurality of sheets is designated by the print job stored in the storing unit, the printing apparatus further comprising:
- a size detecting unit implemented by the at least one processor and configured to detect a sheet size of a sheet stored in the sheet holding unit; and a specifying unit configured to specify, from among the sheet attribute information of the plurality of sheets, sheet attribute information of a sheet including the sheet size detected by the size detecting unit, wherein the sheet attribute information of the plurality of sheets is obtained by the obtaining unit, and
- wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

12. The printing apparatus according to claim 1, further comprising:
- a specifying unit,
- wherein the obtaining unit obtains sheet attribute information of a plurality of sheets, wherein the sheet attribute information of the plurality of sheets is designated by the print job stored in the storing unit,
- wherein the specifying unit is configured to specify, from among the sheet attribute information of the plurality of sheets, the sheet attribute information of a sheet to be initially used in the print job stored in the storing unit, wherein the sheet attribute information of the plurality of sheets is obtained by the obtaining unit, and
- wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

13. The printing apparatus according to claim 1, wherein the obtaining unit obtains sheet attribute information of a plurality of sheets, wherein the sheet attribute information of the plurality of sheets is designated by the print job stored in the storing unit, the printing apparatus further comprising:
- a determining unit implemented by the at least one processor and configured to determine whether the sheet attribute information of the plurality of sheets is already set as attribute information of a sheet stored in the sheet holding unit, wherein the sheet attribute information of the plurality of sheets is obtained by the obtaining unit; and
- a specifying unit implemented by the at least one processor and configured to specify, from among the sheet attribute information of the plurality of sheets, sheet attribute information of a sheet that is determined by the determining unit and is not yet set as attribute information of a sheet stored in the sheet holding unit, wherein the sheet attribute information of the plurality of sheets is obtained by the obtaining unit, and
- wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

14. The printing apparatus according to claim 1, further comprising a specifying unit implemented by the at least one processor,
- wherein the obtaining unit obtains sheet attribute information of a plurality of sheets, wherein the sheet attribute information of the plurality of sheets is designated by the print job stored in the storing unit,
- wherein the specifying unit is configured to specify, from among the sheet attribute information of the plurality of sheets, sheet attribute information of a sheet to be used for the print job stored in the storing unit, amount of the sheet being insufficient for the print job stored in the storing unit, wherein the sheet attribute information of the plurality of sheets is obtained by the obtaining unit, and
- wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

15. The printing apparatus according to claim 1, wherein the sheet attribute information includes at least one of a sheet size, a sheet grammage, and a sheet type.

16. The printing apparatus according to claim 1, wherein the sheet holding unit is a paper feeding cassette, a manual bypass tray, or a paper feeding deck.

17. The printing apparatus according to claim 1, further comprising:
- a specifying unit,
- wherein the obtaining unit obtains sheet attribute information of a plurality of sheets, wherein the sheet attribute information of the plurality of sheets is designated by the print job stored in the storing unit,
- wherein the specifying unit is configured to specify, from among the sheet attribute information of the plurality of sheets, wherein the sheet attribute information of the plurality of sheets is obtained by the obtaining unit, and
- wherein the display unit displays the at least one candidate of sheet attribute information of the sheet in a case where the detecting unit detected that the sheet holding unit has been closed, wherein the at least one candidate of sheet attribute information of the sheet is specified by the specifying unit.

18. A method for controlling a printing apparatus, the method comprising:
- storing a print job or a print queue having plural print jobs;
- obtaining sheet attribute information designated by the stored print job or the stored print queue having plural print jobs;
- detecting that a sheet holding unit has been closed, wherein the sheet holding unit is openable and closable;
- displaying the obtained sheet attribute information in a case where it is detected that the sheet holding unit has been closed;
- receiving, from a user, an instruction for setting a designated sheet attribute information from the displayed sheet attribute information;
- setting, based on the received instruction, the designated sheet attribute information for the sheet holding unit; and
- printing, based on the designated sheet attribute information, an image on a sheet which is conveyed from the sheet holding unit.

19. A non-transitory computer readable storage medium storing a computer program to cause a computer to perform a method for controlling a printing apparatus, the method comprising:

storing a print job or a print queue having plural print jobs;

obtaining sheet attribute information designated by the stored print job or the stored print queue having plural print jobs;

detecting that a sheet holding unit has been closed, wherein the sheet holding unit is openable and closable;

displaying the obtained sheet attribute information in a case where it is detected that the sheet holding unit has been closed;

receiving, from a user, an instruction for setting a designated sheet attribute information from the displayed sheet attribute information;

setting, based on the received instruction, the designated sheet attribute information for the sheet holding unit; and printing, based on the designated sheet attribute information, an image on a sheet which is conveyed from the sheet holding unit.

20. A printing apparatus comprising:

at least one processor coupled to a memory;

a storing unit configured to store a print queue having plural print jobs;

an obtaining unit configured to obtain sheet attribute information designated by the plural print jobs stored in the storing unit;

a detecting unit configured to detect that a sheet holding unit has been closed, wherein the sheet holding unit is openable and closable;

a display unit configured to display at least one of the at least one candidate of sheet attribute information based on the sheet attribute information obtained by the obtaining unit in a case where the detecting unit detected that the sheet holding unit has been closed;

a receiving unit configured to receive, from a user, an instruction for setting a designated sheet attribute information from the at least one candidate of sheet attribute information displayed by the displaying unit;

a setting unit configured to set, based on the instruction received by the receiving unit, the designated sheet attribute information for the sheet holding unit; and a printing unit configured to print, based on the designated sheet attribute information set by the setting unit, an image on a sheet which is conveyed from the sheet holding unit, wherein the obtaining unit, the detecting unit, the receiving unit, and the setting unit are implemented by the at least one processor.

* * * * *